United States Patent [19] [11] 4,127,918
Trimble [45] Dec. 5, 1978

[54] SHIRRING MACHINE MANDREL
[75] Inventor: Roy L. Trimble, Danville, Ill.
[73] Assignee: Teepak, Inc., Chicago, Ill.
[21] Appl. No.: 785,771
[22] Filed: Apr. 7, 1977

Related U.S. Application Data
[63] Continuation-in-part of Ser. No. 729,562, Oct. 4, 1976, Pat. No. 4,086,684.
[51] Int. Cl.² ............................................. A22G 11/02
[52] U.S. Cl. ............................................. 17/41; 17/35
[58] Field of Search ..................... 17/41, 42, 33–35; 137/853

[56] References Cited
U.S. PATENT DOCUMENTS
3,112,517  12/1963  Ives ........................................ 17/42
3,158,896  12/1964  Marbach ............................... 17/42 X
3,462,794  8/1969  Martinek ................................. 17/42

Primary Examiner—Frank T. Yost
Attorney, Agent, or Firm—Charles E. Brown

[57] ABSTRACT

Improved components of a shirring machine including two longitudinally spaced supports and a removable mandrel alternatingly supported thereby. Each support includes a mandrel engaging clamp and means for separately supplying two fluids to the mandrel. The mandrel is provided with two pairs of inlets spaced longitudinally thereof in accordance with the spacing of the supports and cooperable with the supports to independently receive from each of the supports the two separate fluids whereby the mandrel may be alternatingly supported by the supports with the fluids being continuously supplied to the mandrel so that a strand of shirred casing may pass along the entire length of the mandrel without interrupting the fluid flows.

15 Claims, 3 Drawing Figures

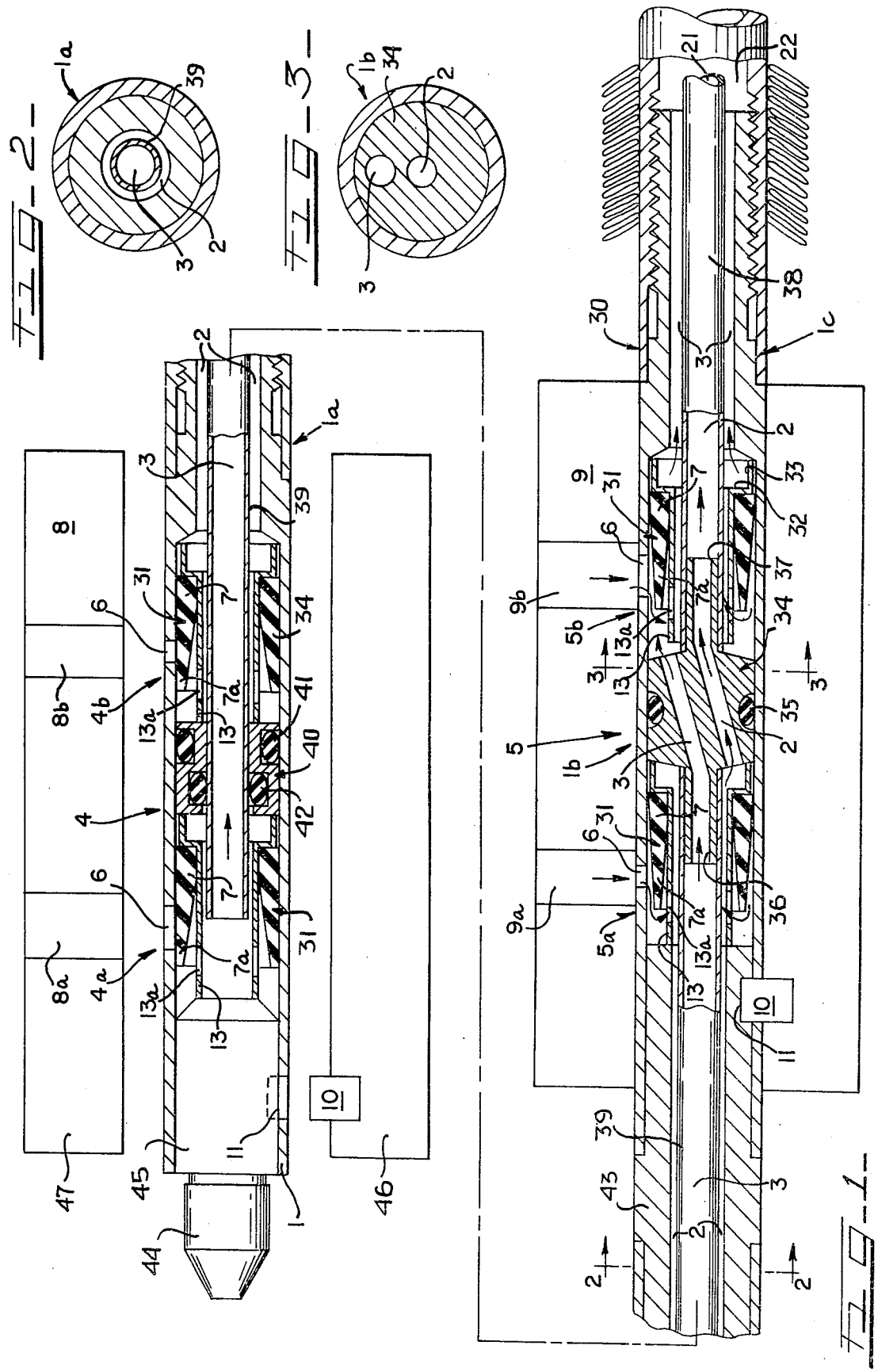

SHIRRING MACHINE MANDREL

This application is a continuation-in-part of my co-pending earlier filed application Ser. No. 729,562, filed Oct. 4, 1976, now U.S. Pat. No. 4,086,684.

This invention relates in general to new and useful improvements in members for supplying to a product and the like two separate fluids and supports for alternatingly supporting the member and supplying the two separate fluids thereto on a continuous basis.

Most particularly, this invention relates to an apparatus for the shirring of thin wall tubular casings and the like.

It is known to provide a pair of longitudinally spaced supports for alternatingly supporting a member, such as a mandrel, and for continuously supplying a single fluid to that mandrel.

It is also well known to provide a single support for a mandrel wherein the support has means for supplying to the mandrel two separate fluids.

It is also well known in the art, as for example, Ives U.S. Pat. No. 3,112,517, to introduce compressed air into the unshirred portion of a casing to inflate the same, whereby it may be more easily fed over a mandrel.

It has also been found that spraying the interior surface of a casing, immediately prior to shirring, with a humidifying agent, such as water, results in a shirred casing strand having superior mechanical properties.

Notwithstanding the aforestated state-of-the-art, no solution heretofore has been found to the alternatingly supporting of a member in a manner wherein two continuous supplies of fluid may be directed into a member for passage therethrough from the supports. As a result, implementation of preshirring inflation and humidification has been hindered by the problems of providing for different flow rates for the air and water, and of maintaining uninterrupted fluid flow during doffing, when a severed strand of shirred casing is passed along the entire length of the shirring mandrel and transferred to a receiving mandrel.

In view of the foregoing, it is the primary object of the present invention to provide an improved member having flow passages therein for directing therethrough two fluids and wherein the member is provided with two longitudinally spaced sets of inlets alternatingly communicatable with two longitudinally spaced supplies of such fluid in a manner wherein the fluids will be automatically directed to the respective flow passages irrespective of which of the two supplies is coupled to the member.

In particular, it is a primary object of the invention to provide an improved shirring mandrel and supports therefore adapted for preshirring introduction of an inflating medium and a humidifying agent into the casing and more particularly, to introduce these fluids at different flow rates and without interruption.

It is a further object of this invention to provide an improved shirring mandrel, which is not only adapted to receive two fluids from two different supports without interruption, but also a shirring mandrel which may be employed with existing shirring machinery with a minimum amount of modification thereto.

With the above and other objects in view that will hereinafter appear, the nature of the invention will be more clearly understood by reference to the following description, the claims, and the several views illustrated in the accompanying drawings.

IN THE DRAWINGS:

FIG. 1 is a longitudinal cross-sectional view with parts broken away of the improved shirring mandrel.

FIG. 2 is a transverse cross-sectional view taken substantially along the line 2—2 of FIG. 1.

FIG. 3 is a transverse cross-sectional view taken substantially along the line 3—3 of FIG. 1.

Referring now to the drawing, it will be seen that the mandrel is generally identified by the numeral 30 and includes a body 1. The body 1 is in the form of a substantially cylindrical hollow member having external dimensions identical with those of a conventional mandrel utilized by existing machines for shirring casings. The body 1 is formed of a plurality of tubular members of varying wall thicknesses and arranged in telescoping relation. Most specifically, the body 1 includes first and second body portions 1a and 1c, respectively, with there being a relatively short intermediate body portion 1b therebetween.

The mandrel 30 has formed internally thereof fluid conveying means including first and second fluid passageways 2 and 3, respectively. In the first and second body portions 1a and 1c, the passageways 2 and 3 are concentrically positioned, the first passageway 2 being outermost in the first body portion 1a, while the second passageway 3 is outermost in the second body portion 1c. In the intermediate body portion 1b, as will be more specifically described hereinafter, the passageways 2 and 3 are eccentric, serving to achieve crossover between the innermost and outermost positions. Outlets 21 and 22, communicating with the first and second passageways 2 and 3, respectively, are formed in the downstream end of the body 1 and are coupled to a nozzle (not shown) to produce spray discharges on the interior surface of the casing material being shirred on the mandrel 30.

The mandrel 30 also includes flow maintaining means for maintaining uninterrupted flow of both fluids during the passage of a shirred casing along the entire length of the mandrel 30. The flow maintaining means includes first and second valve means 4 and 5, respectively, formed in the first and second body portions 1a and 1b, the first valve means 4 being located in the first body portion 1a and the second valve means 5 straddling the intermediate body portion 1b. Each of the valve means 4 and 5 includes paired first and second self-closing valves 4a, 4b and 5a, 5b, respectively, arranged such that one of each pair of valves communicates with the first passageway 2 and the other communicates with the second passageway 3. The valve means 4 and 5 are adapted for alternating flow as will be described hereinafter.

Each of the valves 4a, 4b and 5a, 5b, comprises a port 6 formed in the body 1. The ports 6 are resiliently sealed by cylindrical, hollow, elastomeric flaps 7 arranged concentric with the body 1.

The internal structural details of the mandrel 30 will be specifically described here. First of all, each flap 7 is part of a valve unit generally identified by the numeral 31. The valve unit 31 includes a cylindrical support 13 which terminates at its right end in an outwardly directed annular flange 32 which is reinforced by a cylindrical extension 33. Each flap 7 has a hub portion 34 which is preferably bonded to the support 13 adjacent the flange 32 so that the flap 7 and the support 13 are insertable as a unit. Further, it will be seen that the normal shape of the flap 34 includes a cylindrical exterior and a conical interior so that the flap 7 tapers outwardly in thickness away from the flange 32.

In addition to the valves 5a and 5b, the valve 5 includes a combination support and crossover member 34 in which the eccentric passageways 2 and 3 are formed. The member 34 is of an external size to be snugly received within the body 1 and is sealed relative thereto against the escape of fluids there past by a sealing ring 35.

Projecting from the opposite ends of the member 34 are tubular extensions 36, 37 which form parts of the passageways 2, 3. The tubular extensions 36, 37 are centered with respect to the axis of the body 1 with the member 34 being of a symmetrical construction so that it may be inserted with either of the tubular extensions 36, 37 extending to the right.

Within the body portion 1c, the passageways 2, 3 are defined by a tube 38 which is telescoped over the extension 37 and is suitably secured thereto in sealed relation. The tube 38 defines the outlet 21 and the passageway 2 is within the tube 38 while the passageway 3 is between the tube 38 and the body 1.

Within the body portion 1a, the passageways 2, 3 are defined by a tube 39. The tube 39 is telescoped over and secured in sealed relation to the extension 36 in the body portion 1b. Thus in body portion 1a, the interior of tube 39 defines the passageway 3 while the space between the tube 39 and the body defines the passageway 2.

The valve 4 has disposed between the valve elements 31 thereof a tubular support 40 which is of an external size to snuggly fit in the body 1 and of an internal size to snuggly receive the tube 39. The support 40 is sealed relative to the body 1 by a sealing ring 41 and relative to the tube 39 by a sealing ring 42. It will also be readily apparent that it is immaterial as to the orientation of the support 40.

At this time it is pointed out that the orientation of all of the valve units 31 is the same. This, coupled with the reversible orientation of the supports 34 and 40, greatly facilitate the assembly of the interior components of the mandrel 30.

It will be readily apparent from FIG. 1 that the internal components of the mandrel 30 may be assembled with the body portions 1a and 1b disassembled. A valve assembly 31 is pushed into the body portion 1b until it engages a thickened wall portion of the body. Thereafter the support 34, with the tubes 38 and 39 attached, is pushed into the body portion 1b, followed by the insertion of the second valve element or assembly 31. The body portion 1b is then joined to a thickened wall part 43 of the body which engages the support 13 of the last positioned valve assembly 31 which thus serves to position the support 34.

The left end of the body 1 is provided with a fitting or adaptor 44 which is carried by a plug 45 engaged within the body in sealed relation. With the plug 45 removed, and the tube 39 projecting into the body portion 1a, a first of the valve assemblies 31 is pushed into the body 1 until it strikes a thickened wall portion thereof.

The support 40 is then slid into the body in telescoping relation to the tube 39, followed by the movement of the last of the valve elements 31 into the valve body. The plug 45 is then positioned with the plug 45 engaging the support 13 of the last positioned valve element 31 which, in turn, results in the centering of the support 40.

It is to be understood that the external dimension of the flaps 7 is such that the flaps are compressively engaged within the mandrel body and form a seal therewith. It is also to be understood that the supports 13 limit the deflection of the wall portion 7a of each flap 7 and prevent eversion or dislodgement of the flaps. Support vents 13a are formed in the supports 13 radially inwardly and slightly axially offset from the ports 6 and provide for communication between the ports 6 and the passageways 2 and 3.

The mandrel 30 is alternately supported by one of the openable upstream and downstream clamps 8 and 9, respectively. The clamp 8 includes two halves 46 and 47 with the clamp half 46 being primarily in the form of a support and the clamp half 47 being primarily in the form of a fluid supply member. The clamps 8 and 9 are provided with fluid conduits 8a and 8b, 9a and 9b, respectively, for supplying fluids to the mandrel 30. Valve means (not shown) are included in the conduits 8a, 8b, 9a, 9b, whereby flow is permitted through a clamp which is gripping the mandrel and ceases when the clamp opens.

With respect to the clamp 8, it will be seen that the fluid conduits 8a and 8b are formed in the clamp half 47 with the conduit 8a to be placed into communication with the interior of the tube 39 which at this point in the mandrel defines the flow passage or passageway 3 while the conduit 8b is placed into communications with the body 1 exteriorly of the tube 39, i.e., in communication with the flow passage or passageway 2. Thus in the area of the valve 4, the conduits 8a and 8b may be considered first and second supply conduits and the passageways 3 and 2 may be considered first and second flow passages, respectively. On the other hand, when one considers the valve 5 and the clamp 9, it will be seen that the conduit 9a must be considered to be a second supply conduit while the conduit 9b be considered a first supply conduit. This is because the passageway 2 is disposed outermost at the left end of the valve 5 and the supply conduit 9a must be placed into communication with the passageway 2.

It will be readily apparent that the supply conduit 9b must be placed into communication with the passageway 3. Thus at the right side of the valve 5, the passageway 3 is disposed outermost. This relationship of the passageways 2 and 3 at opposite sides of the valve 5 is permitted by the crossover member 34 and the sloping passageways 2 and 3 therein.

From the foregoing, it will also be readily apparent that in the valve 4 the left inlet 6 must be considered a first inlet with the right inlet 6 being a second inlet. With respect to FIG. 1, the left inlet 6 must be considered the second inlet and the right inlet 6 the first inlet.

In use, the casing is shirred on the downstream end of the mandrel by means well known in the art. Initially the upstream clamp 9 is closed about the mandrel, while the downstream clamp 8 is opened (FIG. 1). After a suitable length of casing has been shirred on the mandrel, a predetermined length thereof is severed from the following casing. The severed strand is urged upstream along the mandrel 30, past the downstream clamp 9 to a position between the clamps 8 and 9. The downstream clamp 9 is then closed and the upstream clamp 8 opened. As the upstream clamp 8 opens, the flaps 7 of the valves 4a and 4b reassume their undeflected position sealing the ports 6 of the first valve means 4 while in the closed downstream clamp 9, external fluid pressure being applied to the flaps 7 and the valves 5a and 5b cause a deflection thereof and permits fluid to flow through the ports 6 of the second valve means 5. The severed casing strand may now be slid along the remaining length of the mandrel 30 and removed at the upstream end thereof. It is to be noted that continuous fluid flow is maintained during this operation and that shirring need not be interrupted.

Pins 10 are provided on the clamps 8 and 9 for mating with recesses 11 in the mandrel body 1. The mandrel 30 is thus interlocked at all times with whichever of the c lamps 8 and 9 is in the closed, supporting position, with displacement of the mandrel thereby being prevented.

While the preferred arrangement of the parts and method of application has been shown in illustrating the invention, it is to be clearly understood that various changes in details of the mandrel may be made without departing from the spirit and scope of the claims appended hereto.

I claim:

1. An elongated member particularly adapted for continuously separately supplying two fluids from longitudinally spaced alternating supply sources, said member having first and second receiving areas longitudinally spaced in accordance with the intended spacing of said supply areas, said first receiving area including a first inlet for a first of the fluids and a second inlet spaced from said first inlet in the direction of said second receiving area for receiving a second of the fluids, said second receiving area including in longitudinal sequence a third inlet for receiving the second fluid and a fourth inlet for receiving the first fluid, and passage defining means within said member defining a first flow passage in communication with said first and fourth inlets and a second flow passage in communication with said second and third inlets.

2. The member of claim 1 wherein said first and second flow passages are disposed one within the other with said first flow passage being innermost between said receiving areas and outermost beyond said second receiving area.

3. The member of claim 1 wherein said passage defining means includes cross over means positioned between said third and fourth inlets.

4. The member of claim 1 together with a separate valve for closing each of said inlets, said valves being disposed within said member.

5. An elongated member particularly adapted for continuously separately supplying first and second fluids from longitudinally spaced alternating supply sources, said member comprising an outer casing having first and second inlets at two longitudinally spaced areas thereof, means within said casing and extending between said areas defining first inner and outer longitudinally extending flow passages with said first inner flow passage being in communication with said first inlet at a first of said spaced areas and said first outer flow passage being in communication with said second inlets at both of said spaced areas, means within said casing beginning at said second area defining second inner and outer longitudinally extending flow passages with said outer flow passage being in communication with said first inlet at said second area, and cross over means within said casing placing said first inner flow passage in communication with said second outer flow passage and said first outer flow passage in communication with said second inner flow passage, said first and second inlets being longitudinally spaced at each of said areas and in reverse order at said second area.

6. The member of claim 5 wherein said cross over means are disposed at said second area.

7. The member of claim 5 together with a separate check valve within said casing normally closing each of said inlets.

8. An elongated member particularly adapted for continuously separately supplying first and second fluids from longitudinally spaced alternating supply sources, said member comprising an outer casing having first and second inlets at two longitudinally spaced areas thereof, said first and second inlets being longitudinally spaced at each of said areas and in reverse order at said second area, a first support within said casing at said first area between said first and second inlets and a second support within said casing at said second area between said second and first inlet, means sealing said support relative to said casing, said second support having sloping first and second passages therethrough and said first support having a passage therethrough, a first tube within said casing extending from a point adjacent to said first inlet of said first area through said first support in sealed relation thereto and to said second support in sealed relation to said first passage of said second support, said first tube together with said casing defining a first inner flow passage in communication with said first area first inlet and a first outer flow passage in communication with both of said second inlets, said second support second passage being in communication with said first outer flow passage, and second tube extending from said second support in sealed communication with said second support second flow passage, said second tube together with said casing defining a second inner flow passage in communication with said first outer flow passage and a second outer flow passage in communication with said second area first inlet and second first inner flow passage.

9. The member of claim 8 together with a separate check valve for each of said inlets, said check valves being disposed with said casing.

10. The member of claim 9 wherein all of said check valves are identical.

11. The member of claim 9 wherein all of said check valves are identical and of like orientation.

12. The member of claim 9 wherein each check valve is of a tubular resilient construction and has a sealing fit in said casing.

13. The member of claim 12 wherein each check valve is carried by a tubular support which also forms means for limiting opening movement of the respective check valve.

14. In combination, a pair of spaced supports and a member for separately delivering two fluids, each of said supports including a clamp member and first and second supply conduits for supplying the two fluids, each of said supports being capable of independently supporting said member, and said member having sets of first and second inlets in alignment with said first and second supply conduits whereby the two fluids may be continuously supplied to said member while the member is alternatively supported by said supports, and flow passage means within said member for separately conveying the two fluids, first and second supply conduits of each support being longitudinally spaced and being of opposite orientation in said two supports.

15. The combination of claim 14 wherein said flow passage means are primarily concentrically arranged passageways with the relative inner and outer positions of said passageways being reversed generally between the inlets of the second of said sets of first and second inlets.

* * * * *